United States Patent [19]

Carr

[11] Patent Number: 5,451,384
[45] Date of Patent: Sep. 19, 1995

[54] PROCESS FOR REDUCING THE CONTENT OF METAL CARBONYLS IN GAS STREAMS

[75] Inventor: Norman L. Carr, Wexford, Pa.

[73] Assignee: Den Norske Stats Oljeselskap A.S., Stavanger, Norway

[21] Appl. No.: 52,395

[22] Filed: Apr. 23, 1993

[51] Int. Cl.⁶ ............................................. B01D 53/64
[52] U.S. Cl. ...................................... 423/210; 95/133
[58] Field of Search ................ 423/210, 245.1; 95/133

[56] References Cited

U.S. PATENT DOCUMENTS

| | | | |
|---|---|---|---|
| 1,631,823 | 6/1927 | Jannek | 423/210 |
| 3,782,076 | 1/1974 | Carr et al. | 95/133 |
| 3,789,581 | 2/1974 | Carr et al. | 95/92 |
| 4,142,875 | 3/1979 | Bohmholdt et al. | 423/561.1 |
| 4,176,165 | 11/1979 | Hargett et al. | 423/210 |
| 4,492,676 | 1/1985 | Baur et al. | 423/210 |
| 4,671,803 | 6/1987 | Suggitt | 423/210 |
| 4,740,361 | 4/1988 | Heyd et al. | 95/133 |

FOREIGN PATENT DOCUMENTS

| | | | |
|---|---|---|---|
| 1041026 | 10/1978 | Canada | 95/133 |
| 114426 | 10/1900 | Germany | 423/210 |

OTHER PUBLICATIONS

N. L. Carr and D. L. Stahlfeld, Gulf Research & Development Co., Pittsburgh, Pa., and H. G. Robertson, Gulf Oil Products Co., Port Arthur, Texas, *Remove Arsine to Protect Catalyst, lead oxide and copper oxide eliminate arsine from the feed to units to avoid catalyst deactivation,* Hydrocarbon Processing, May 1985.

*Primary Examiner*—Wayne Langel
*Assistant Examiner*—Peter T. DiMauro
*Attorney, Agent, or Firm*—Kirkpatrick & Lockhart

[57] ABSTRACT

A process for substantially removing the metal carbonyl content of a gas stream, such as a stream of synthesis gas, by contacting the gas stream with lead oxide, PbO, dispersed upon a support.

19 Claims, No Drawings

PROCESS FOR REDUCING THE CONTENT OF METAL CARBONYLS IN GAS STREAMS

BACKGROUND OF THE INVENTION

1. Technical Field of the Invention

This invention relates to a process for removing, or at least substantially reducing, metal carbonyls in a gaseous stream, such as a synthesis gas stream, by making use of a lead oxide, PbO, on a gamma alumina sorbent.

2. Background of the Invention and Prior Art

Metal containing catalysts are used to catalyze many important industrial processes, such as ammonia synthesis, methanol synthesis, and Fischer-Tropsch synthesis of hydrocarbons and oxygenated hydrocarbons. The metal catalysts are susceptible to catalyst poisoning by even minute amounts of metal carbonyls, such as iron carbonyl, cobalt carbonyl and nickel carbonyl, when found in the gas streams in these processes. When carbon monoxide is present in any appreciable amount in the gas stream under conditions of relatively low temperatures (about 25° to 100° C.) and particularly at elevated pressure, contact with iron, nickel or cobalt metals will cause the formation of metal carbonyls. Iron carbonyl is often formed by the reaction of carbon monoxide with steel materials in the process equipment. Also, metal carbonyls can form when the gases are transported in steel containers.

During synthesis processes, the process catalysts themselves are not usually vulnerable because the processes are run under conditions which are not conducive to the formation of metal carbonyls. Problems arise, however, in the stages of the process preceding the reaction zones. At this stage, conditions often permit the formation of metal carbonyls upstream of the reaction steps. When these carbonyls reach the reaction zone, they poison the process catalysts, notwithstanding the proper control of the conditions in the reaction zones.

The synthesis of ammonia involves the use of a synthesis gas from which the carbon monoxide has been removed and which has been adjusted to a ratio of 3 parts of hydrogen and 1 part of nitrogen. Processing with a catalyst at high temperatures and pressures yields ammonia.

Methanol is a major petrochemical product having a great variety of uses and many believe that it will become an important energy carrier in the future. The most important source for methanol production nowadays is natural gas. When natural gas is used as a feed in methanol production, the natural gas feed is freed from any sulphur impurities by catalytic or adsorption processes before entering one or several reformer stages in which the natural gas is transformed into a synthesis gas of suitable composition for methanol production. Methanol is produced at pressures of about 60 to 100 bar and temperatures of about 200° to 300° C. in the presence of a catalyst. Even relatively small amounts of iron carbonyl, $Fe(CO)_5$, of about 5 ppm in the feed gas have been found to poison the catalysts used in the methanol synthesis.

The third process of particular interest is the Fischer-Tropsch synthesis of hydrocarbons and oxygenated hydrocarbons. The hydrocarbon product from this process is transformed into hydrocarbon fuel, in particular high quality diesel fuels and blending components for other fuels. This process has therefore been in the focus of interest for quite a number of years, but due to technical and economical reasons has not until now been deemed economically viable, except under particular economic and political conditions. Due to technical developments in recent years, the Fischer-Tropsch synthesis is now on the brink of being declared economically feasible in situations where, for instance, large supplies of natural gas are available at low costs in remote areas and an effective method is needed for converting the natural gas into a synthetic crude capable of being transported to facilities located near larger fuel markets and refineries.

As for the production of methanol, natural gas for the production of Fischer-Tropsch products is first converted into a synthesis gas containing hydrogen and carbon monoxide in a suitable ratio. The synthesis gas is produced by one of several processes, some depending on the source of the hydrocarbon. Both natural gas and clean coal are now sources for synthesis gas.

The processes used to synthesize syngas from natural gas are (1) steam-methane reforming, (2) partial oxidation using oxygen and methane feed, and (3) autothermal reforming of methane with oxygen or air or combinations thereof. The coal-source synthesis gas is produced from partial oxidation of coal using oxygen.

All of these processes have the potential for producing syngas which can be contaminated with iron carbonyl in downstream pipe, vessels, and other process equipment. The Fischer-Tropsch synthesis is carried out in a subsequent step in which hydrogen and carbon monoxide react at pressures of about 10 to 50 bar and temperatures in the range of about 150° to 300° C., in the presence of a suitable catalyst, which normally comprises iron or cobalt dispersed on a suitable support.

In order to eliminate or reduce the risk of catalyst poisoning by metal carbonyls in the above-mentioned processes and similar processes, it would be desirable to effectively remove or substantially reduce the metal carbonyl from the respective feed gas streams to the lowest possible level before converting the feed gas streams as described.

Suggestions have been made in the art to pretreat synthesis gas to remove metal carbonyls by making use of materials including molecular sieves, alumina, Cu, CuO, and ZnO.

Thus, Dvorak, L. et al. (Chemical Abstracts, Vol. 96 (1982), Abstract No. 164.903e) have attempted to remove residual quantities of sulphur compounds and/or iron pentacarbonyl, $Fe(CO)_5$, from gas mixtures by contacting the gases with spent catalysts, the main components of which were Cu and/or CuO and ZnO. Only small amounts of iron carbonyl were sorbed from the gases.

The problems with these suggestions are two fold. First, the adsorbents, such as, molecular sieves and alumina have a low adsorption capacity, and second, the Cu and CuO sorbents have the draw back of being hydrogenation catalysts. When used, they can convert some of the syngas to methane and alcohols. This of course is undesirable.

It has also been proposed to use copper coated tubes in the process plant to avoid reaction of the synthesis gas with iron and nickel with formation of iron and nickel carbonyls. However, such a solution to the problem is unpractical and expensive. The normal procedure to reduce the potential formation of $Fe(CO)_5$ in syngas streams is to use austenitic (18/8) stainless steel pipes and vessels. But this option may not be practical.

U.S. Pat. No. 3,782,076 to Norman L. Carr et al., which issued on Jan. 1, 1974, teaches the use of an oxide of lead dispersed on an alumina support in a process for reducing the arsenic content of a gaseous hydrocarbon stream. While the feed gas described in the Carr et al. patent might typically contain relatively small quantities of carbon monoxide (0.2 to 3.4 Vol. %), there is no teaching that metal carbonyls would be formed. Further, it is believed that detectable levels of metal carbonyls would not be formed with the low levels of carbon monoxide described in the Carr et al. patent. The levels of carbon monoxide are greater in the feed streams used in Fischer-Tropsch, methanol and ammonia syntheses than those described in the Carr et al. patent. Thus, the formation of metal carbonyls, while not a problem in the method described in the Cart et al. patent, is a serious problem in other processes.

SUMMARY OF THE INVENTION

It has now surprisingly been found that lead oxide, PbO, is capable of effectively removing metal carbonyls from gas streams, such as synthesis gas streams used in the Fischer-Tropsch, ammonia or methanol synthesis processes.

Thus, according to the present invention there is provided a process for reducing the metal carbonyl content of a gas stream which contains appreciable proportions of carbon monoxide, for example, a synthesis gas stream, in which process the gas stream is contacted with a metal oxide dispersed on a support. The characteristic feature of the process consists in there being used as metal oxide a lead oxide, PbO, dispersed on a high surface area support.

Although the process is primarily intended for removal of iron carbonyl, related metal carbonyl compounds such as nickel and cobalt carbonyls are also removed by the process.

The advantages of using a PbO on gamma alumina sorbent are many. The removal is fast. It may involve a chemical reaction and/or a strong physical adsorption. The loading of Fe deposited from $Fe(CO)_5$ removal can be very high, up to about 5 wt. % iron on the sorbent trap. These factors are conducive to commercially attractive performance: a high capacity for Fe capture, the long life of the sorbent and the ability to use small removal reactors because of fast rates of removal.

Another advantage of using a supported PbO sorbent is that it is noncatalytic for synthesis and hydrogenation reactions while used for treating synthesis gases for metal carbonyl removal. It is therefore deemed a selective agent for removal of metal carbonyl contaminants from syngas.

DETAILED DESCRIPTION OF THE INVENTION

Any gas stream containing metal carbonyls can be treated by the process of the present invention. The gaseous streams that can particularly benefit from treatment by the process of the invention are various synthesis gases for use in processes such as ammonia synthesis, methanol synthesis, Fischer-Tropsch synthesis and similar syntheses.

The synthesis gas to be treated will typically contain major proportions of carbon monoxide and hydrogen, and for some purposes also nitrogen. An appreciable proportion of carbon monoxide will be a part of these gas streams. Appreciable proportion, as used herein, shall mean that the gas streams will be comprised of at least 5 mol % carbon monoxide, and preferably at least 10 mol % carbon monoxide. The precise composition of the synthesis gas, however, may vary within wide limits. Typically, it will contain about 10 to about 90% by volume of carbon monoxide, about 10 to about 90% by volume of hydrogen, and 0 to about 80% by volume of nitrogen, the balance being made up of other gaseous components such as carbon dioxide, methane, higher hydrocarbons and oxygenated hydrocarbons, hydrogen sulphide, water, argon and traces of other noble gases.

It is known that sulphur compounds, such as $H_2S$, will poison the catalysts used in processes downstream of the metal carbonyl trap. It is also known that certain sulphur compounds will compete with the removal of metal carbonyls from the gas stream. Accordingly, the gas stream is preferably free from sulphur compounds. Various sulphur compounds may be removed from the gas stream by any of the methods well known in the art. Such methods include, for example, the use of zinc oxide for $H_2S$ removal, the use of liquid solutions of amines or the use of caustic solutions when $H_2S$ is present in large amounts, e.g., sodium hydroxide solutions. Preferably, sulphur will already have been removed from the gas to be treated prior to contact with the metal carbonyl trap. If only trace levels of $H_2S$ exist in the syngas, e.g., $<1$ ppm, then PbO dispersed on alumina can be used effectively to remove $H_2S$ also.

The metal carbonyl content of the synthesis gas streams to be treated will typically be of the order of 5 ppm or higher. Lower levels of carbonyl can also be effectively removed by this process. Following contact with a properly designed sorbent reactor, the metal carbonyl content of the gas stream is reduced to a value lower than 1 ppm and typically, less than 0.1 ppm. The terms removal, remove, effective removal and the like, as used herein, mean substantial removal or substantial reduction to levels that are either not detectable by current detection methods or to levels that have been shown to eliminate catalyst poisoning downstream. In this application the term "ppm" means "parts per million" and such parts are parts by volume unless otherwise indicated. For the purpose of this application the lead oxide will be termed a "sorbent".

The support on which the lead oxide is dispersed is preferably selected from refractory metal oxides having a large surface area or mixtures of such metal oxides. Gamma alumina having a surface area in the range of 150 to 350 $m^2/g$ is particularly suitable.

The amount of lead oxide dispersed on the support is suitably in a range of about 5 to about 50 wt. %, and preferably in a range of about 10 to about 30 wt. %, of the total sorbent plus support, and most preferably about 20 wt. %.

The lead oxide employed in the process of the invention is most easily converted to a high surface area form by dispersion onto a suitable high surface area support. The manner of dispersing the lead oxide on the supports is not critical and may be accomplished by means well known in the art. Briefly, the technique involves the deposition of lead from a solution, preferably aqueous, of a suitable lead salt such as lead nitrate followed by calcination in the presence of air to produce a sorbent comprising PbO. The lead salt which is employed must be one which will decompose to the desired lead oxide form on calcining or which can be oxidized to the desired lead oxide form under conditions which will not impair the desired surface area characteristics of the support.

Suitable high surface area supports are those well known in the art as catalyst supports. Examples of suitable supports are the usual porous naturally occurring or synthetically prepared high surface area, i.e. greater than about 50 m$^2$/g, refractory metal oxides well known in the art as catalyst supports, e.g. alumina, silica, boria, thoria, magnesia or mixtures thereof. Preferably, the support is one of the partially dehydrated forms of alumina. More preferably, the alumina is one having a surface area in excess of 50 m$^2$/g, preferably a surface area of 150 to 350 m$^2$/g. Suitable forms of the higher surface area aluminas and their methods of preparation are described in the Kirk-Othmer Encyclopedia of Chemical Technology, Second Edition, Volume 2, pages 41 et seq. Other suitable supports include clays, zeolites and crystalline silica aluminas.

The influence of the pressure on the uptake of metal carbonyl in the process of the invention is not critical, and operable pressures may range from 0.1 to 1000 bar. Approximately identical results were achieved in comparable tests at 30 and 50 bar pressure at temperatures of 25° C. to 110° C.

The temperatures to be employed in the process of the invention can suitably be at about 100° C. or below. Under suitable conditions, temperatures above 100° C. may be employed also. However, the recommended temperature is usually within the range of about 0° to about 100° C., preferably 0° to about 50° C., and is more preferably in the range of 25° to about 50° C. Temperatures below 0° C. are usually undesirable from a commercial point of view because of high cooling costs. Temperatures above 100° C. may be undesirable because the sorbent may tend to form carbon deposits from the CO, especially in the absence of hydrogen.

At temperatures above 70° C., and with a CO feed, a black deposit begins to form in increasing amounts as the temperature increases. The deposits may clog the pores of the sorbent and reduce its capacity for uptake of metal carbonyl. The black deposit also forms to some extent at lower temperatures (around 70° C.) if iron has been deposited on the sorbent.

The performance of the sorbent for carbonyl removal per se can be effective at temperatures of 100° C., but is optimal at temperatures around 25° C. At such temperatures, the service life is long and the energy consumption is minimized. Furthermore, when carbon monoxide is the feed gas, the lower temperature operation is preferred in order to reduce carbon formation in the carbonyl reaction zone. Since the performance of the trap is not sensitive to pressure variations, the trap may be operated at pressures that are useful for synthesis gas treatments ahead of Fischer-Tropsch reactors.

The invention is illustrated by the following, non-limiting examples.

In both of the examples, gases containing Fe(CO)$_5$ were purified by means of iron carbonyl traps containing sorbent particles comprising PbO dispersed on gamma-alumina. The amounts of Fe(CO)$_5$ adsorbed by the PbO/gamma-alumina particles were determined by measuring the amounts of Fe trapped on the sorbent, in the following manner: to 1 gram of a finely divided sample there was added 10 ml of 50% hydrochloric acid, and the solution was gently heated for about 30 minutes. The solution was then transferred to a 100 ml graduated flask and diluted with distilled water to 100 ml. The flask was shaken at regular intervals to dissolve the iron contained in the precipitation formed. The precipitation was allowed to form a sediment and the iron content of the clear solution was determined by atomic absorption. Standard iron solutions having the same acid strength as the samples were used as reference solutions.

EXAMPLE 1

Removal of Fe(CO)$_5$ from a CO Gas.

The capacity of PbO/gamma-alumina for removal of iron carbonyl from a CO gas was determined. The iron carbonyl trap was constituted by two tubes of stainless steel of type 316 connected in parallel, each tube having a length of 1 m and an inner diameter of 9.65 mm and being filled with spherical particles of PbO dispersed on gamma-alumina (21.4% by weight of PbO, the balance being gamma-alumina, obtained from Mallinckrodt, Inc.), having a diameter of about 3 mm.

The CO gas was supplied from a gas cylinder (99.0% CO obtained from Norsk Hydro a.s.). In order to achieve the desired concentration of iron carbonyl in the CO gas, the gas was passed through an iron carbonyl generator constituted by a tube filled with iron filings before the gas was admitted to the tubes containing PbO. Tests were performed to determine the characteristics of the PbO/gamma-alumina using a Carlo Erba porosimeter, model 1500 and a Carlo Erba Sorptomatic model 1800. Prior to testing the specimens were exposed to vacuum at pressures less than 10$^{-4}$ mmHg and a temperature of 250° C. for 1 hour. The employed PbO/gamma-alumina had the following characteristics:

| Specific surface area | 272 m$^2$/g |
|---|---|
| Macropore surface r > 50 Å | 16 m$^2$/g |
| Micropore surface r < 50 Å | 256 m$^2$/g |
| Pore volume | 0.42 cm$^3$/g |
| Macropore volume | 0.15 cm$^3$/g |
| Micropore volume | 0.27 cm$^3$/g |
| Porosity | 61% |
| Particle density | 1.46 g/cm$^3$ |
| Skeleton density | 3.81 g/cm$^3$ |

Before each run, 0.07 to 0.08 kg of PbO/gamma-alumina was introduced in each of the steel tubes of the reactor. To remove moisture in the pores of the PbO/gamma-alumina particles the iron carbonyl trap was purged with nitrogen for a period of 4 hours. The temperature was then stabilized at the desired level, whereupon the introduction of nitrogen gas was discontinued and carbon monoxide gas was introduced in a desired amount via the iron carbonyl generator.

Runs were conducted at three temperatures, 25° C., 70° C. and 110° C., at pressures of 30 bar and 50 bar. The experimental conditions and the results are presented in the following Table 1. The amounts of Fe trapped on the PbO/gamma-alumina are expressed in % by weight, based on the amount of PbO/gamma-alumina.

The analysis of the data in Table 1 shows that sharper Fe removal rates (gradients) occur within the first three zones. The data also show that higher loadings occur in the first zone at 25° C., and the lowest at both 70° and 110° C. The highest gradients were evident at 25° C. One interpretation of these data is that a chemical reaction between Fe(CO)$_5$ and PbO occurs, and another is that physical adsorption is responsible for trapping the carbonyl.

The uptake of iron carbonyl was evident at all temperatures, but black deposits were observed when the temperature was 110° C. The iron carbonyl uptake was very satisfactory at 25° C. Lower temperatures are, therefore, preferred, based on carbon monoxide feed gas.

TABLE 1

Fe(CO)$_5$ sorbed in lead oxide trap
Feed gas: CO

| Run No. | Gas flow rate (Nl/min) | Temp. (C.) | Pressure (bar) | Iron carb. conc. (ppm) | Hours on stream | FE TRAPPED ON SORBENT (% BY WEIGHT) ZONE OF THE TRAP, FROM INLET END | | | | | | | REF.[1] STREAM |
|---|---|---|---|---|---|---|---|---|---|---|---|---|---|
| | | | | | | 1 | 2 | 3 | 4 | 5 | 6 | 7 | |
| 1 | 1.35 | 70 | 50 | 20 | 23.4 | 0.6340 | 0.1750 | 0.0675 | 0.0032 | 0.0030 | 0.0032 | | 0.0041 |
| 2 | 1.22 | 70 | 50 | 10 | 24 | 0.4260 | 0.2870 | 0.0816 | 0.0048 | 0.0041 | 0.0041 | 0.0036 | 0.0041 |
| 3 | 1.34 | 25 | 50 | 10 | 24 | 0.5760 | 0.2030 | 0.0108 | 0.0042 | 0.0035 | 0.0037 | 0.0034 | 0.0041 |
| 4 | 1.22 | 110 | 50 | 45 | 23 | 0.1390 | 0.0288 | 0.0260 | 0.0233 | 0.0213 | 0.0538 | | 0.0107 |
| 5 | 1.34 | 25 | 50 | 45 | 23 | 1.4880 | 1.5200 | 0.4140 | 0.0059 | 0.0040 | 0.0032 | 0.0103 | 0.0107 |
| 6 | 1.67 | 110 | 30 | 25 | 23 | 0.8730 | 0.1420 | 0.0213 | 0.0246 | 0.0304 | 0.0211 | 0.1060 | 0.0070 |
| 7 | 1.75 | 25 | 30 | 25 | 23 | 1.1240 | 0.9330 | 0.0517 | 0.0050 | 0.0067 | 0.0029 | 0.0030 | 0.0070 |

[1]CO reference gas with no extra Fe(CO)$_5$ added, i.e., CO feed gas bypassing the iron carbonyl generator.

EXAMPLE 2

Removal of Fe(CO)$_5$ from a Synthesis Gas

A synthesis gas consisting essentially of H$_2$ and CO in a ratio of 2:1 by volume and containing about 7 ppm Fe(CO)$_5$ was purified in an iron carbonyl trap constituted by two tubes of acid-resistant stainless steel of type 316 connected in series, each tube having a length of 2 m and a diameter of 25.4 mm. The tubes were filled with PbO/gamma-alumina pellets of the type used in Example 1. The synthesis gas contained about 7 ppm of Fe(CO)$_5$ and the gas flow rate was 31.25 Nl/min. The run was conducted at 25° C., a pressure of 20 bar and a gas hourly space velocity of about 1000 GVHSV. The duration of the run was 20 days.

The results are set out in Table 2 below. The amounts of Fe trapped on the PbO/gamma-alumina are given in % by weight, based on the amount of PbO/gamma-alumina. Samples 1 to 5 were taken from zones of the iron carbonyl trap, regularly spaced along the whole length of the trap, starting from the inlet end thereof. Sample 6 was a metal carbonyl free, pure sample serving as a reference.

TABLE 2

| Sample No. | Fe, % wt |
|---|---|
| 1 (inlet end) | 1.49 |
| 2 | 1.33 |
| 3 | 0.268 |
| 4 | 0.154 |
| 5 (outlet end) | 0.0042 |
| 6 (Pure) | 0.0033 |

As shown by the Fe values in Table 2, an effective removal of Fe(CO)$_5$ by the PbO/gamma-alumina was achieved during the 20 days on stream.

The embodiments of this invention which are exemplified above are intended solely as illustrations of the invention and should not be interpreted as limiting the scope of the invention to just those features which are exemplified. Those skilled in the art will appreciate that modifications may be made in the specific arrangements described herein without departing from the scope of the present invention as expressed in the appended claims.

What is claimed is:

1. A process for substantially reducing the metal carbonyl content of a gas stream comprised of at least 5 mol % of carbon monoxide, the process comprising:
    contacting the gas stream with lead oxide dispersed on a support under conditions such that metal carbonyl in the gas stream reacts with lead oxide to remove said metal carbonyl from the gas stream.

2. The process recited in claim 1 wherein the metal carbonyl is iron carbonyl.

3. The process recited in claim 1 wherein the metal carbonyl is nickel carbonyl.

4. The process recited in claim 1 wherein the metal carbonyl is cobalt carbonyl.

5. The process recited in claim 1 wherein the content of metal carbonyl in the gas stream before the contact with the lead oxide is in excess of 5 ppm.

6. The process recited in claim 5 wherein the content of metal carbonyl after contact of the gas stream with the lead oxide is lower than 1 ppm.

7. The process recited in claim 1 wherein the support is a porous refractory metal oxide having a surface area greater than about 50 m$^2$/g.

8. The process recited in claim 1 wherein the support is gamma-alumina having a surface area of 150 to 350 m$^2$/g.

9. The process recited in claim 1 wherein the gas stream is a synthesis gas, the major proportion of said synthesis gas containing carbon monoxide and hydrogen.

10. The process recited in claim 1 wherein the gas stream is contacted with the lead oxide at a temperature within a range of 0° to about 100° C.

11. The process recited in claim 1 wherein the gas stream is contacted with the lead oxide at a temperature within a range of 0° to about 50° C.

12. The process recited in claim 1 wherein the gas stream is contacted with the lead oxide at a temperature of about 25° to about 50° C.

13. The process recited in claim 1 wherein the amount of lead oxide dispersed on the support is from about 5 to about 50 wt. % of the lead oxide and support combined.

14. The process recited in claim 1 wherein the amount of lead oxide dispersed on the support is from about 10 to about 30 wt. % of the lead oxide and support combined.

15. A process comprising:
    contacting a stream of gas comprised of about 10 to about 90% by volume carbon monoxide, about 10 to about 90% by volume hydrogen, 0 to about 80% by volume nitrogen, and containing amounts of metal carbonyl, with a sorbent comprised of lead oxide dispersed on a porous refractory metal oxide support having a surface area of at least 50 m$^2$/g and at operating conditions sufficient so as to react the metal carbonyl with the lead oxide and to substantially reduce the metal carbonyl content of the gas stream.

16. The process recited in claim 15 wherein the support is an alumina support.

17. The process recited in claim 15 wherein the content of metal carbonyl in the gas stream following contact with the sorbent is lower than 1.0 ppm.

18. The process recited in claim 15 wherein the amount of lead oxide dispersed on the support is from about 5 to about 50 wt. % of the lead oxide and support combined.

19. A process comprising:
  passing a stream of gas which includes more than 1 ppm metal carbonyls through a trap comprised of lead oxide on a support so as to react the metal carbonyl with the lead oxide and to substantially reduce the metal carbonyl content of the gas stream to levels less than 1 ppm.

* * * * *